(12) United States Patent
Knight

(10) Patent No.: US 7,478,765 B2
(45) Date of Patent: Jan. 20, 2009

(54) SPRAY APPARATUS

(76) Inventor: Brian George Knight, Knight Farm Machinery Limited, Wireless Hill, South Luffenham, Oakham (GB) LE15 8NF ( * ) Notice: Subject to any disclaimer, the term of this patent is extended or adjusted under 35 U.S.C. 154(b) by 0 days.

(21) Appl. No.: 11/353,540

(22) Filed: Feb. 13, 2006

(65) Prior Publication Data
US 2007/0187527 A1 Aug. 16, 2007

(51) Int. Cl.
*B05B 9/00* (2006.01)
(52) U.S. Cl. .............. 239/125; 239/124; 239/127; 239/159; 239/119; 239/172
(58) Field of Classification Search .............. 239/124, 239/125, 126, 127, 172, 176, 119
See application file for complete search history.

(56) References Cited

U.S. PATENT DOCUMENTS 2,525,128 A * 10/1950 Gunnison ............... 239/127
2,800,365 A * 7/1957 Hodges ................... 239/119
3,001,720 A * 9/1961 Cartwright .............. 239/112
3,023,968 A 3/1962 Mitchell
4,274,585 A * 6/1981 Lestradet ................. 239/124
5,520,333 A * 5/1996 Tofte ........................ 239/10
5,957,621 A * 9/1999 Clark et al. .............. 404/111
6,827,289 B2 * 12/2004 Filicicchia et al. ....... 239/124

FOREIGN PATENT DOCUMENTS

DE 3401734 A1 1/1985
EP 1294228 B1 6/2001

* cited by examiner

*Primary Examiner*—Dinh Q Nguyen
(74) *Attorney, Agent, or Firm*—Townsend and Townsend and Crew LLP

(57) ABSTRACT

Spray apparatus of the kind having a liquid feed line connecting a supply of spray liquid and at least one spray nozzle, a return line from the spray nozzle to the supply and a pump for moving spray liquid from the supply to the at least one spray nozzle and for returning spray liquid from the at least one spray nozzle to the supply when the liquid is not being sprayed, characterised in that the liquid return line serves as at least a portion of the feed line when spraying.

6 Claims, 4 Drawing Sheets

SPRAY APPARATUS

BACKGROUND OF THE INVENTION

The invention relates to spray apparatus primarily for use in agriculture, although such apparatus may find application in horticulture or in industry generally.

Circulation in the boom spray lines of agricultural crop spray apparatus has become an increasingly important part of the modern machine. Inventions such as that known by the trade name LASER, see EP 0 820 224 B1 and sold by Knight Farm Machinery Limited and which concern the agitation of spray liquid in the spray lines to provide a simple addition to a standard sprayer or the more conventional pressurised circulation systems, are well known.

Spray line circulation was one of the early building blocks towards a modern sprayer design that is now increasingly influenced by environmental considerations.

One very significant area of concern is in the volume of spray liquid retained within the spray apparatus when the sprayer stops working. This is known as sprayer retained volume or SRV. Typically this could be as much as 100 liters or more. Recent work has been done to significantly reduce this by condensing the plumbing system of the sprayer and reducing the number of components. Today SRV can be as low as 20 liters on some machines but more typically would be around 50 liters.

Customers continue to ask for wider booms which obviously have to be fitted with spray lines. This results in more pipe-work and forces SRV upward. Any recirculation system adds to the pipe-work and increases the problem further.

With booms now being built up to 48 m in width, there are also pressure losses in the pipe-work that can affect the chemical output across the boom. This calls for bigger pipe-work, which increases retained volumes.

BRIEF SUMMARY OF THE INVENTION

With most sprayers the recirculation pipe-work is redundant when the sprayer is actually spraying. This is because we require as much pump flow as possible and would not want any flow to be bypassed. Also we normally monitor the flow to the boom for calibration purposes and therefore it is convenient to assume that all the flow is sprayed on the crop. Clearly this redundant pipe-work would be a good place to significantly reduce SRV.

Accordingly, the present invention provides spray apparatus comprising a pipe-work system that combines the feed and circulation lines on the spray boom to make a common feed when the machine is spraying and which converts back to recirculation when the sprayer is agitating, i.e. in a non-spraying condition. This also permits a reduction in the number of valves on the spray machine and greatly simplifies the pipe-work.

A further advantage is that the distribution of the inlets along the boom tube can be improved which means the boom tube can be smaller.

BRIEF DESCRIPTION OF THE DRAWINGS

The invention is diagrammatically illustrated, by way of example, in the accompanying drawings, in which.

DETAILED DESCRIPTION OF THE INVENTION

Figure 1:
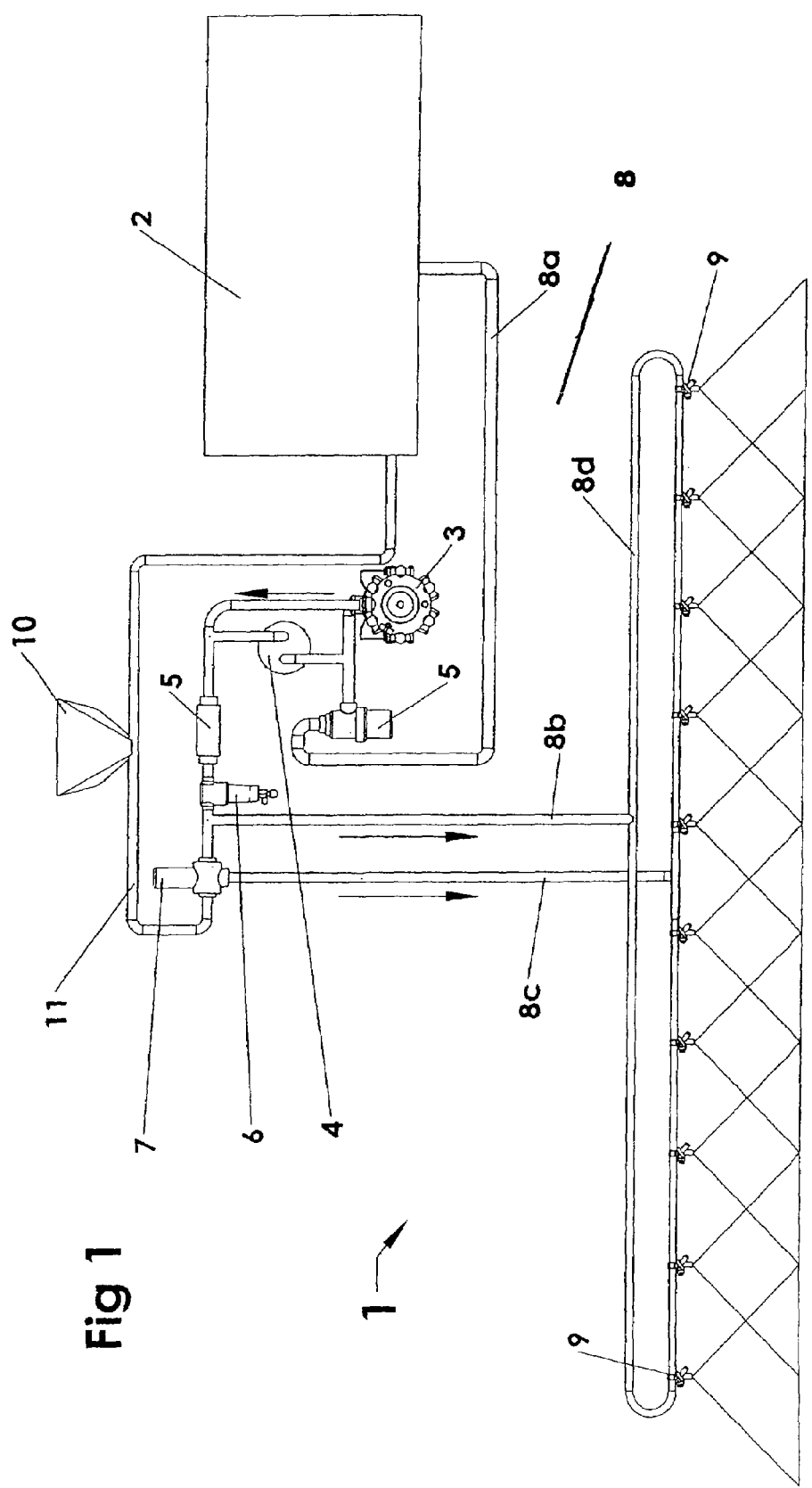
FIG. 1 is a flow diagram of an agricultural crop sprayer when configured for spraying.

In the drawings, an agricultural crop sprayer 1, of the kind that can be vehicle mounted or towed by a tractor, comprises a source of spray liquid 2 in the form of a tank connected by pipe-work 8 to a pump 3 and thus to spray nozzles 9, so that the spray liquid can be applied to a crop.

As shown in the drawings, the pipe-work, hereafter lines, comprise a feed portion 8a, which connects the tank 2 with the pump 3 via a suction filter 5. Downstream of the pump 3 is positioned a pressure regulator 4 which couples the feed portion 8a upstream and downstream of the pump 3. Downstream of the pressure regulator, a flow meter is positioned in the feed portion 8a, which communicates with a feed line branch 8b which communicates with a spray line loop 8d having a plurality of spray nozzles 9. The loop 8d will, in practice, be arranged to extend along the sprayer boom (not shown).

Downstream of the flow meter 5, the feed line is connected via a pressure filter 6 and a control valve 7 with a feed line branch 8c, which is coupled to the loop 8d at a position opposite to the junction between the feed line branch 8b and the loop.

During spraying, the flow of spray liquid through the apparatus is as shown by arrows in FIG. 1. Thus the spray liquid flows along both feed line branches 8c and 8b to the spray line loop 8d and thence to the nozzles.

Figure 2:
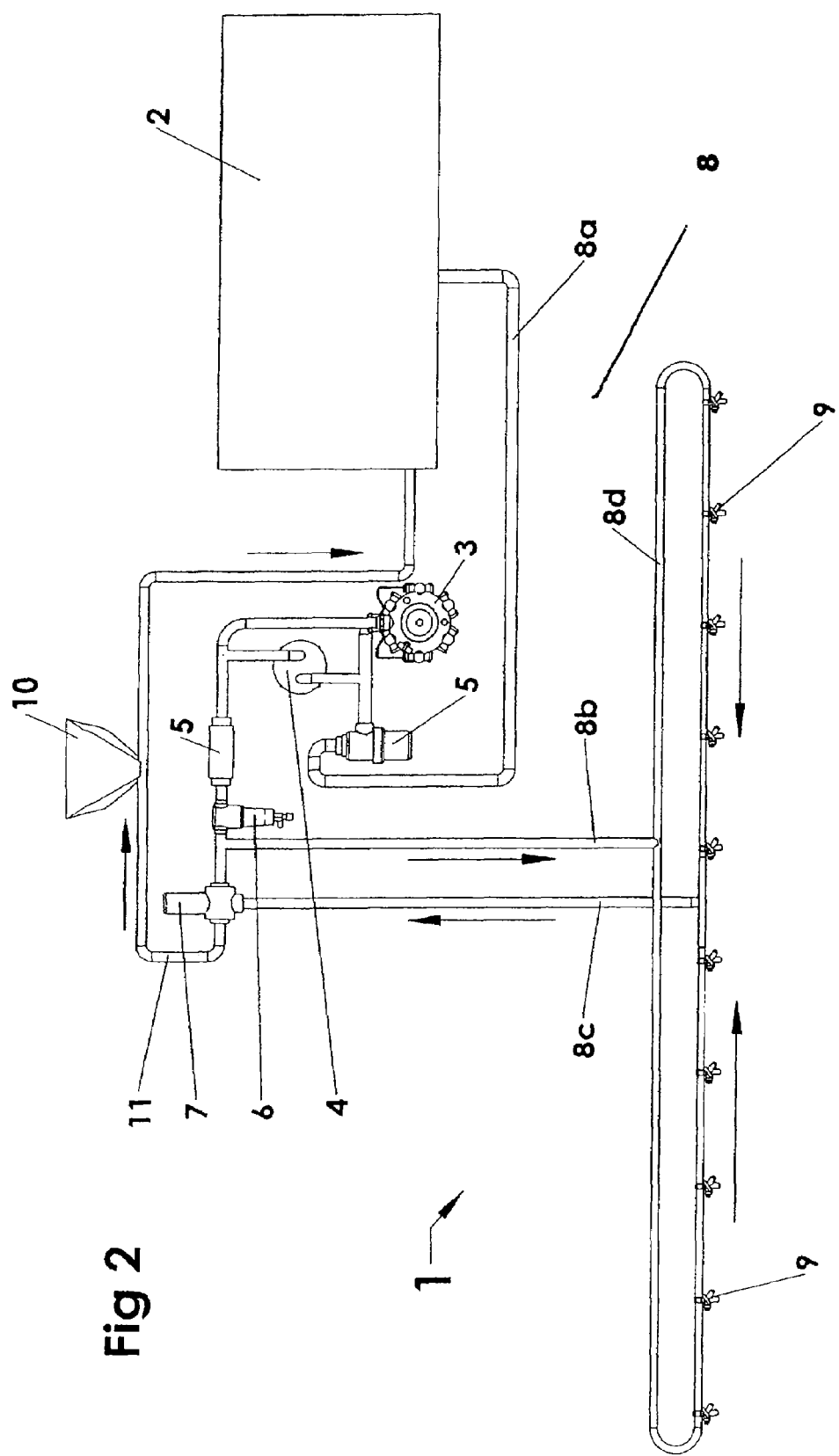
FIG. 2 shows the flow diagram of FIG. 1 when the spray is configured to circulate, and thus agitate the spray liquid in the spray lines.

When spraying ceases, the flow of spray liquid in the apparatus is shown in FIG. 2. Thus the spray nozzles are shut-off and the control valve 7 is operated to direct the spray liquid back to the tank via the feed line branch 8c, which thus functions as a return line. It will be noted that the portion 11 of the return line downstream of the valve 7 is provided with a filling hopper 10 by which chemical to be sprayed can be introduced into the apparatus.

The drawings thus show how the feed line enters the spray line loop at both ends. This allows pressure and flow from both ends of the spray line when spraying and a clean sweep through the lines when agitating.

Figure 3:
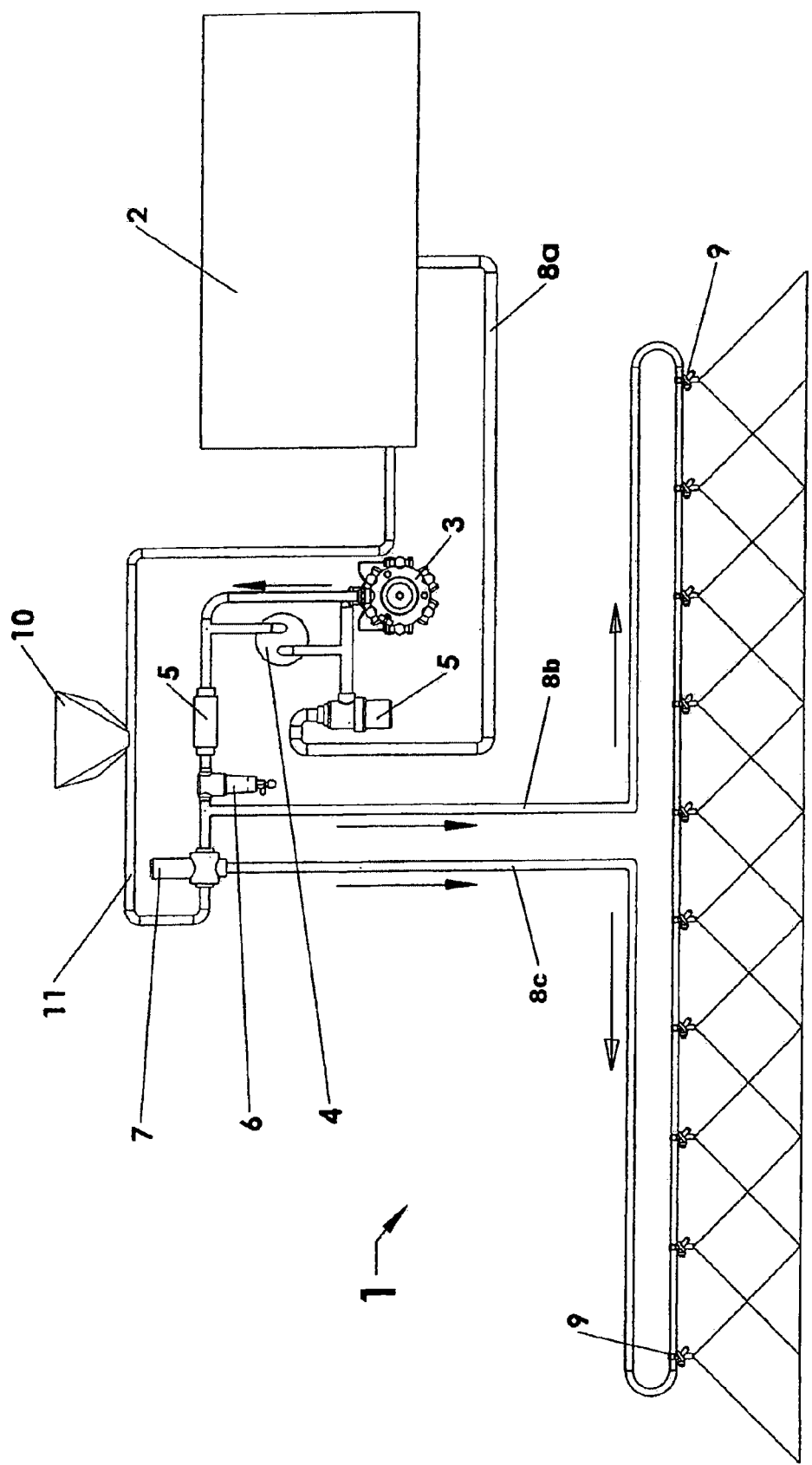
FIG. 3 shows a spray apparatus according to an embodiment of the invention, configured for spraying.

FIG. 3 shows a spray apparatus according to an embodiment of the invention, configured for spraying. Feed line branch 8b functions as a liquid feed line and is coupled to one end of the spray line. Feed line branch 8c functions as a return line during circulation, and is coupled to the other end of the spray line. During spraying, spray liquid flows toward the at least one spray nozzle 9 through the liquid feed line and the return line simultaneously.

Figure 4:
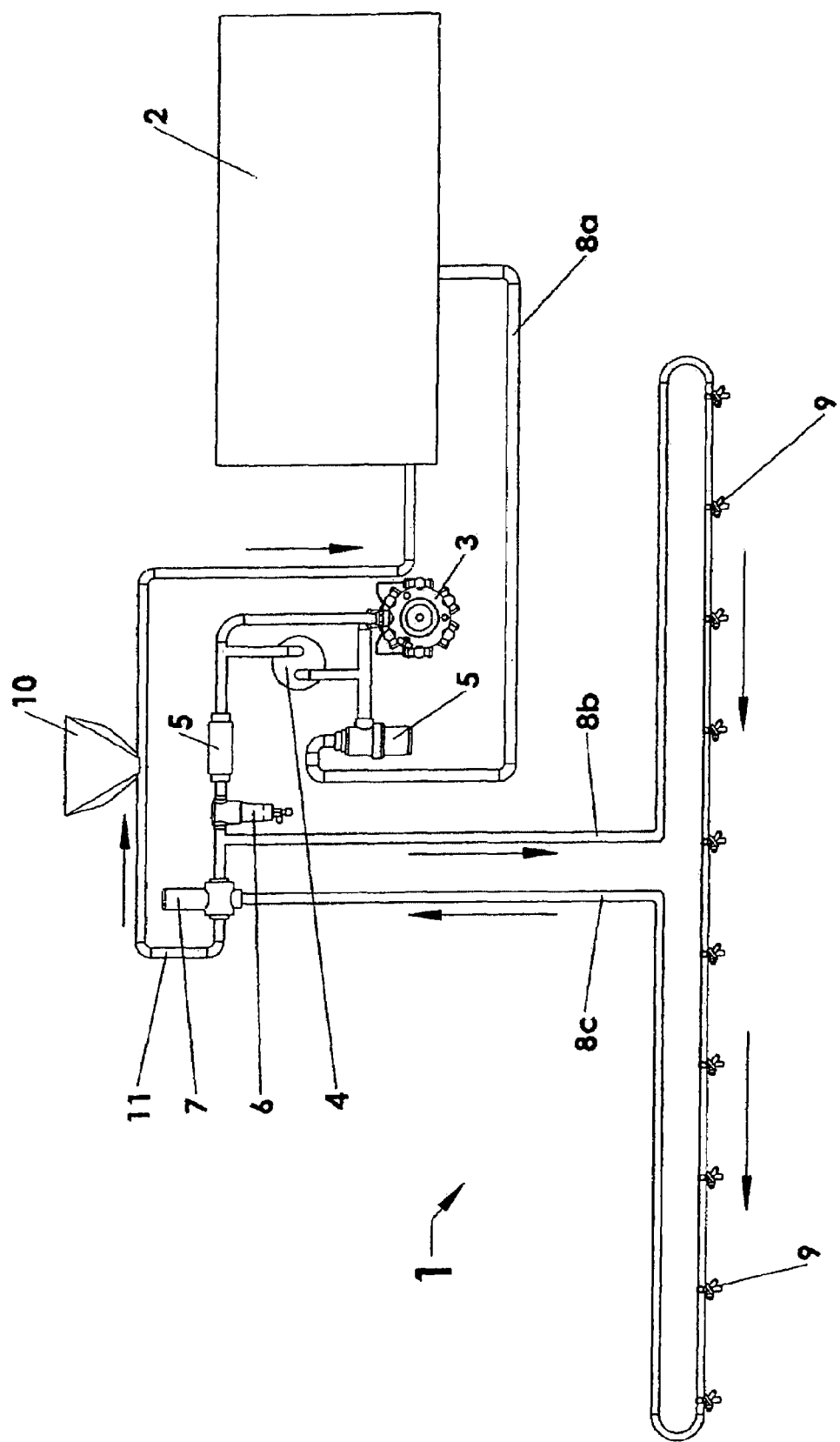
FIG. 4 shows the spray apparatus of FIG. 3 configured to circulate, and thus agitate the spray liquid.

FIG. 4 shows the spray apparatus of FIG. 3 configured to circulate, and thus agitate the spray liquid. Feed line branch 8c functions as a return line during circulation, so that spray liquid circulates from the supply, through the feed line, past the at least one spray nozzle, then through the return line, accomplishing the "clean sweep" through the lines previously mentioned. During circulation, spray liquid thus enters the spray line at one end and exits the spray line at the other end.

The control valve 7 that permits the changeover from spray to circulation can be a conventional motorised 3 way valve assembly. As with other pressurised circulation systems the nozzles may be individually switched in banks according to the required spray boom section widths.

Thus the present invention permits:

1. The use of the return line to provide extra flow to the boom when spraying.

2. A reduction in the size of the feed lines because the return line provides extra flow when spraying.

3. The purging of the spray line under pressure when filling with chemical.

4. The use of a single control valve to control the feed and return flows.

5. The ability to clean the system by incorporating clean water into the filling point (on board tank or independent supply).

What is claimed is:

1. Agricultural spray apparatus comprising:
   a supply of agricultural spray liquid;
   a spray boom on which is located a spray line having a first end and a second end and at least one spray nozzle between the two ends;
   a pipe-work system comprising a liquid feed line extending along the spray boom and connecting the supply of spray liquid and the at least one spray nozzle, and the pipe-work system also comprising a return line extending along the spray boom from the spray nozzle to the supply, wherein the feed line is coupled to the first end of the spray line and the return line is coupled to the second end of the spray line; and
   a pump for moving spray liquid from the supply to the at least one spray nozzle and for returning spray liquid from the at least one spray nozzle to the supply when the liquid is not being sprayed;
   wherein during spraying, spray liquid flows from the supply toward the at least one spray nozzle on the spray boom through both the liquid feed line and the return line simultaneously;
   and wherein during circulation spray liquid circulates from the supply, through the feed line, past the at least one spray nozzle, then through the return line.

2. Agricultural spray apparatus according to claim 1, comprising a pressure regulator and a flow meter in the feed line between the pump and the at least one spray nozzle, the pressure regulator being positioned upstream of the flow meter.

3. Agricultural spray apparatus according to claim 1, further comprising a single control valve that controls the feed and return flows.

4. Agricultural spray apparatus, comprising:
   a supply of agricultural spray liquid;
   a spray boom on which is located a spray line having two ends and delivering liquid to at least one spray nozzle;
   a pipe-work system comprising a liquid feed line on the spray boom, the liquid feed line connecting the supply of spray liquid and the spray line, the pipe-work system also comprising a return line, the return line extending from the spray line to the supply; and
   a pump for moving spray liquid from the supply to the spray line and for returning spray liquid from the spray line to the supply when the liquid is not being sprayed;
   wherein during spraying, spray liquid flows from the supply toward the at least one spray nozzle in the spray boom though both the liquid feed line and the return line simultaneously and enters the spray line at both ends;
   and wherein during circulation, spray liquid circulates between the supply and the at least one spray nozzle through both the liquid feed line and the return line, entering the spray line at one end and exiting the spray line at the other end.

5. Agricultural spray apparatus according to claim 4, further comprising a single control valve that controls the feed and return flows.

6. Agricultural spray apparatus according to claim 4, further comprising a pressure regulator and a flow meter in the feed line between the pump and the at least one spray nozzle, the pressure regulator being positioned upstream of the flow meter.

* * * * *

UNITED STATES PATENT AND TRADEMARK OFFICE
CERTIFICATE OF CORRECTION

| | | |
|---|---|---|
| PATENT NO. | : 7,478,765 B2 | Page 1 of 1 |
| APPLICATION NO. | : 11/353540 | |
| DATED | : January 20, 2009 | |
| INVENTOR(S) | : Brian George Knight | |

It is certified that error appears in the above-identified patent and that said Letters Patent is hereby corrected as shown below:

At Column 4, line 22, the word "though" should be changed to --through--.

Signed and Sealed this

Seventeenth Day of March, 2009

JOHN DOLL
*Acting Director of the United States Patent and Trademark Office*